(12) United States Patent
Young et al.

(10) Patent No.: US 7,100,980 B2
(45) Date of Patent: Sep. 5, 2006

(54) VEHICLE SEAT ASSEMBLY HAVING A VEHICLE OCCUPANT SENSING SYSTEM WITH A BIASING PAD

(75) Inventors: Oliver J. Young, Grosse Pointe Farms, MI (US); Asad S. Ali, Troy, MI (US); John F. Nathan, White Lake Township, MI (US); Christopher T. Ricard, Rochester, MI (US); Ash Galbreath, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/974,155

(22) Filed: Oct. 27, 2004

(65) Prior Publication Data

US 2006/0087164 A1 Apr. 27, 2006

(51) Int. Cl.
*A47C 7/62* (2006.01)
*B60R 21/16* (2006.01)

(52) U.S. Cl. .............................. 297/217.2; 297/217.3; 297/463.2; 280/735

(58) Field of Classification Search ............. 297/217.2, 297/217.3, 463.2; 280/735
See application file for complete search history.

(56) References Cited

U.S. PATENT DOCUMENTS

| | | | | |
|---|---|---|---|---|
| 4,031,579 A | * | 6/1977 | Larned ........................ | 5/652.1 |
| 5,404,128 A | | 4/1995 | Ogino et al. .............. | 340/425.5 |
| 5,413,378 A | | 5/1995 | Steffens, Jr. et al. ........ | 280/735 |
| 5,474,327 A | | 12/1995 | Schousek ..................... | 280/735 |
| 5,485,000 A | | 1/1996 | Schneider ................... | 235/494 |
| 5,570,903 A | | 11/1996 | Meister et al. .............. | 280/735 |
| 5,594,222 A | | 1/1997 | Caldwell ..................... | 200/600 |
| 5,653,462 A | | 8/1997 | Breed et al. ................ | 280/735 |
| 5,694,320 A | | 12/1997 | Breed .................. | 364/424.055 |
| 5,731,781 A | | 3/1998 | Reed .......................... | 342/135 |
| 5,739,757 A | | 4/1998 | Gioutsos ..................... | 340/667 |
| 5,748,473 A | | 5/1998 | Breed et al. .......... | 364/424.055 |
| 5,769,489 A | * | 6/1998 | Dellanno ............... | 297/216.14 |
| 5,810,392 A | | 9/1998 | Gagnon ..................... | 280/735 |
| 5,822,707 A | | 10/1998 | Breed et al. .................. | 701/49 |
| 5,829,782 A | | 11/1998 | Breed et al. ................ | 280/735 |
| 5,835,613 A | | 11/1998 | Breed et al. ................ | 382/100 |
| 5,848,802 A | | 12/1998 | Breed et al. ................ | 280/735 |
| 5,877,677 A | | 3/1999 | Fleming et al. ............. | 340/436 |
| 5,890,758 A | | 4/1999 | Pone et al. ................... | 297/15 |
| 5,901,978 A | | 5/1999 | Breed et al. ................ | 280/735 |
| 5,931,254 A | | 8/1999 | Loraas et al. ............... | 180/272 |
| 5,931,527 A | | 8/1999 | D'Onofrio et al. ......... | 297/146 |

(Continued)

FOREIGN PATENT DOCUMENTS

EP 0 689 967 A1 3/1996

(Continued)

*Primary Examiner*—Rodney B. White
(74) *Attorney, Agent, or Firm*—Bill Panagos

(57) ABSTRACT

A vehicle occupant sensing system for a vehicle seat assembly that includes at least one emitter and at least one sensor operable to detect relative distance between the sensor and the emitter to thereby detect a condition of the vehicle seat assembly. The vehicle occupant sensing system also includes a biasing pad adapted so as to be disposed below a seat cushion of the vehicle seat assembly so as to deflect in response to deflection of the seat cushion. The biasing pad supports at least one of the emitter and the sensor such that the emitter and the sensor are biased away from each other and such that one of the emitter and the sensor are supported for movement toward and away from the other.

20 Claims, 1 Drawing Sheet

U.S. PATENT DOCUMENTS

| | | | |
|---|---|---|---|
| 5,943,295 A | 8/1999 | Varga et al. ................. 367/99 |
| 5,954,398 A | 9/1999 | Namba et al. .............. 297/257 |
| 5,971,432 A | 10/1999 | Gagnon et al. ............. 280/735 |
| 5,975,612 A | 11/1999 | Macey et al. ................. 296/66 |
| 6,012,007 A | 1/2000 | Fortune et al. ............... 701/45 |
| 6,020,812 A | 2/2000 | Thompson et al. ......... 340/438 |
| 6,027,138 A | 2/2000 | Tanaka et al. .............. 280/735 |
| 6,030,038 A | 2/2000 | Namba et al. .............. 297/257 |
| 6,039,139 A | 3/2000 | Breed et al. ................. 180/271 |
| 6,039,344 A * | 3/2000 | Mehney et al. ............. 280/735 |
| 6,043,743 A | 3/2000 | Saito et al. ................. 340/562 |
| 6,045,405 A | 4/2000 | Geltsch et al. ............. 439/620 |
| 6,056,079 A | 5/2000 | Cech et al. ................. 180/273 |
| 6,059,358 A | 5/2000 | Demick et al. ........ 297/188.04 |
| 6,078,854 A | 6/2000 | Breed et al. ................. 701/49 |
| 6,079,763 A | 6/2000 | Clemente ................. 296/65.05 |
| 6,081,757 A | 6/2000 | Breed et al. ................. 701/45 |
| 6,087,598 A * | 7/2000 | Munch .................. 280/735 X |
| 6,088,640 A | 7/2000 | Breed ......................... 701/45 |
| 6,089,641 A | 7/2000 | Mattarella et al. ............. 296/64 |
| 6,092,838 A * | 7/2000 | Walker ....................... 280/735 |
| 6,101,436 A | 8/2000 | Fortune et al. ............... 701/45 |
| 6,102,463 A | 8/2000 | Swanson et al. ......... 296/37.15 |
| 6,116,639 A | 9/2000 | Breed et al. ................. 280/735 |
| 6,129,168 A | 10/2000 | Lotito et al. ................. 180/273 |
| 6,129,404 A | 10/2000 | Mattarella et al. ........ 296/65.09 |
| 6,134,492 A | 10/2000 | Breed et al. ................. 701/49 |
| 6,138,067 A | 10/2000 | Cobb et al. ................. 701/45 |
| 6,141,432 A | 10/2000 | Breed et al. ................. 382/100 |
| 6,168,198 B1 | 1/2001 | Breed et al. ................. 280/735 |
| 6,175,980 B1 * | 1/2001 | Gaither .............. 297/228.12 X |
| 6,186,537 B1 | 2/2001 | Breed et al. ................. 280/735 |
| 6,220,627 B1 | 4/2001 | Stanley ........................ 280/735 |
| 6,234,519 B1 | 5/2001 | Breed ......................... 280/735 |
| 6,234,520 B1 | 5/2001 | Breed et al. ................. 280/735 |
| 6,242,701 B1 | 6/2001 | Breed et al. ................. 177/144 |
| 6,250,671 B1 | 6/2001 | Osmer et al. ............... 280/735 |
| 6,250,672 B1 | 6/2001 | Ryan et al. .................. 280/735 |
| 6,253,134 B1 | 6/2001 | Breed et al. ................. 701/49 |
| RE37,260 E | 7/2001 | Varga et al. .................. 367/99 |
| 6,254,127 B1 | 7/2001 | Breed et al. ................. 280/735 |
| 6,270,116 B1 | 8/2001 | Breed et al. ................. 280/735 |
| 6,279,946 B1 | 8/2001 | Johnson et al. ............. 280/734 |
| 6,283,503 B1 | 9/2001 | Breed et al. ................. 280/735 |
| 6,323,444 B1 | 11/2001 | Aoki .......................... 177/144 |
| 6,324,453 B1 | 11/2001 | Breed et al. ................. 701/45 |
| 6,325,414 B1 | 12/2001 | Breed et al. ................. 280/735 |
| 6,330,501 B1 | 12/2001 | Breed et al. ................. 701/49 |
| 6,342,683 B1 | 1/2002 | Aoki et al. .................. 177/144 |
| 6,353,394 B1 | 3/2002 | Maeda et al. ............... 340/667 |
| 6,393,133 B1 | 5/2002 | Breed et al. ................. 382/100 |
| 6,394,490 B1 | 5/2002 | Osmer et al. ............... 280/735 |
| 6,397,136 B1 | 5/2002 | Breed et al. ................. 701/45 |
| 6,407,347 B1 | 6/2002 | Blakesley .................... 177/144 |
| 6,412,813 B1 | 7/2002 | Breed et al. ................. 280/735 |
| 6,416,080 B1 | 7/2002 | Gillis et al. .................. 280/735 |
| 6,419,315 B1 * | 7/2002 | Hiemstra ................. 297/216.1 |
| 6,422,595 B1 | 7/2002 | Breed et al. ................. 280/735 |
| 6,442,465 B1 | 8/2002 | Breed et al. ................. 701/45 |
| 6,442,504 B1 | 8/2002 | Breed et al. ................. 702/173 |
| 6,445,988 B1 | 9/2002 | Breed et al. ................. 701/45 |
| 6,452,870 B1 | 9/2002 | Breed et al. ................. 367/99 |
| 6,457,545 B1 | 10/2002 | Michaud et al. ............ 180/272 |
| 6,474,739 B1 | 11/2002 | Lagerweij .................... 297/341 |
| 6,476,514 B1 | 11/2002 | Schondorf ................. 307/10.1 |
| 6,506,069 B1 | 1/2003 | Babala et al. ................ 439/248 |
| 6,605,877 B1 | 8/2003 | Patterson et al. ........... 307/10.1 |
| 6,609,054 B1 | 8/2003 | Wallace ....................... 701/45 |
| 6,677,539 B1 * | 1/2004 | Miura et al. .............. 280/735 X |
| 6,820,896 B1 * | 11/2004 | Norton ....................... 280/735 |
| 6,975,239 B1 * | 12/2005 | Young et al. ................ 340/667 |
| 6,994,397 B1 * | 2/2006 | Young et al. ............. 297/217.2 |
| 7,017,699 B1 * | 3/2006 | Becker et al. ............... 180/273 |
| 7,021,707 B1 * | 4/2006 | Young et al. ............. 297/217.2 |
| 7,026,946 B1 * | 4/2006 | Saunders et al. ............ 340/666 |
| 7,034,709 B1 * | 4/2006 | Young et al. ................ 340/667 |
| 7,046,158 B1 * | 5/2006 | Saunders et al. ............ 340/666 |
| 2002/0003345 A1 | 1/2002 | Stanley et al. .............. 280/735 |
| 2002/0056975 A1 | 5/2002 | Yoon et al. .................. 280/735 |
| 2002/0079728 A1 | 6/2002 | Tame ....................... 297/344.1 |
| 2002/0098730 A1 | 7/2002 | Babala et al. ................ 439/248 |
| 2002/0105221 A1 * | 8/2002 | Wolfe ....................... 297/463.2 |
| 2002/0195807 A1 | 12/2002 | Ishida ........................ 280/735 |
| 2003/0040858 A1 | 2/2003 | Wallace ..................... 701/144 |
| 2003/0071479 A1 | 4/2003 | Schaller et al. ............. 296/144 |
| 2003/0085060 A1 * | 5/2003 | Becker et al. ........... 280/735 X |
| 2003/0090133 A1 | 5/2003 | Nathan et al. ............... 297/144 |
| 2003/0106723 A1 | 6/2003 | Thakur et al. ............... 177/144 |
| 2003/0111276 A1 | 6/2003 | Kajiyama ................... 177/144 |
| 2003/0164715 A1 | 9/2003 | Lester ........................ 324/661 |
| 2003/0171036 A1 | 9/2003 | Aujla et al. ................. 439/660 |
| 2003/0189362 A1 | 10/2003 | Lichtinger et al. ........ 297/217.3 |
| 2003/0196495 A1 | 10/2003 | Saunders et al. ....... 73/862.041 |
| 2003/0220766 A1 | 11/2003 | Saunders et al. ............ 702/173 |
| 2004/0160110 A1 * | 8/2004 | Enomoto et al. ......... 297/452.5 |
| 2004/0232751 A1 | 11/2004 | Basir et al. .................. 297/338 |
| 2004/0262957 A1 * | 12/2004 | Young et al. ............. 297/217.3 |
| 2004/0262958 A1 * | 12/2004 | Young et al. ............. 297/217.3 |
| 2004/0262959 A1 * | 12/2004 | Ali et al. .................. 297/217.3 |
| 2004/0262960 A1 * | 12/2004 | Young et al. ............. 297/217.3 |
| 2004/0262961 A1 * | 12/2004 | Young et al. ............. 297/217.3 |
| 2004/0262962 A1 * | 12/2004 | Young et al. ............. 297/217.3 |
| 2004/0262963 A1 * | 12/2004 | Ali et al. .................. 297/217.3 |
| 2004/0262978 A1 * | 12/2004 | Young et al. ................ 297/464 |
| 2004/0263344 A1 * | 12/2004 | Young et al. ............ 297/464 X |
| 2005/0029843 A1 * | 2/2005 | Young et al. ............. 297/217.1 |
| 2005/0093350 A1 * | 5/2005 | Ali et al. .................. 297/217.3 |
| 2005/0284668 A1 * | 12/2005 | Hida et al. ................... 177/136 |
| 2005/0284669 A1 * | 12/2005 | DiPaola et al. ............. 177/136 |
| 2006/0066085 A1 * | 3/2006 | DuRocher .................... 280/735 |
| 2006/0091655 A1 * | 5/2006 | Sallam et al. ............... 280/735 |
| 2006/0091656 A1 * | 5/2006 | Sallam et al. ............... 280/735 |
| 2006/0091657 A1 * | 5/2006 | Sallam et al. ............... 280/735 |
| 2006/0097497 A1 * | 5/2006 | Sallam et al. ............... 280/735 |

FOREIGN PATENT DOCUMENTS

WO    WO 98/41424    3/1997

\* cited by examiner

VEHICLE SEAT ASSEMBLY HAVING A VEHICLE OCCUPANT SENSING SYSTEM WITH A BIASING PAD

BACKGROUND OF THE INVENTION

1. Field of the Invention

The present invention relates, generally, to a vehicle seat assembly, and more particularly to a vehicle seat assembly having a vehicle occupant sensing system with a biasing pad.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt extending diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision, whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that are capable of detecting whether or not a given seat is occupied. The systems act as a switch in controlling the deployment of a corresponding air bag. If the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright toward the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It will be appreciated that these occupant sensing systems provide valuable data, allowing the vehicle safety systems to function more effectively to reduce injuries to vehicle occupants.

One example of an occupant sensing system is shown and described in the published patent application having U.S. Ser. No. 10/249,527 and Publication No. US2003/0196495 A1 filed in the name of Saunders et al. The Saunders et al. application discloses a method and apparatus for sensing seat occupancy including an array of sensor/emitter pairs that are each supported within a pre-assembled one-piece cylinder-shaped housing. The housing is adapted to be mounted within the seat cushion, extending from the B-surface toward the A-surface of the seat cushion. The sensor/emitter pair supported in the housing includes an emitter that is mounted within the seat cushion and spaced below the upper or A-surface of the seat cushion. In addition, the sensor is also electrically connected to a flexible circuit and supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor that is electrically connected to the flexible circuit, and the processor receives the sensor signals and interprets the signals to produce an output to indicate the presence of an occupant in the seat.

Although vehicle seat assemblies with occupant sensing systems of the prior art have generally worked for their intended purposes, problems still remain. For instance, occupant sensing systems, such as the Saunders et al. system, include a significant number of components. Assembly of these systems can be time consuming and costly as a result. Therefore, there is an ongoing need in the art for a vehicle seat assembly with a reduced part count.

Furthermore, the load bearing response of the occupant sensing system may need adjustment. In the case of the Saunders et al. system, the housing of each sensor/emitter can be exchanged with housings exhibiting a different resiliency. However, exchanging each housing would likely be time consuming and costly. Therefore, there is an ongoing need in the art for an occupant sensing system that can be adjusted to alter its load bearing response more easily and at lower cost.

SUMMARY OF THE INVENTION

The present invention overcomes the disadvantages of the prior art in a vehicle occupant sensing system for detecting a condition of a vehicle seat assembly. The vehicle occupant sensing system includes at least one emitter and at least one sensor operable to detect relative distance between the sensor and the emitter to thereby detect a condition of the vehicle seat assembly. The vehicle occupant sensing system also includes a biasing pad adapted so as to be disposed below a seat cushion of the vehicle seat assembly so as to deflect in response to deflection of the seat cushion. The biasing pad supports at least one of the emitter and the sensor such that the emitter and the sensor are biased away from each other and such that one of the emitter and the sensor are supported for movement toward and away from the other. The vehicle occupant sensing system can be employed in a vehicle seat assembly.

Advantageously, the vehicle occupant sensing system includes relatively few parts. As such, assembly time and cost of the vehicle occupant sensing system is reduced. Also, by altering the material of the biasing pad, the load bearing response of the vehicle occupant sensing system can be easily changed. For instance, the biasing pad may be exchanged with a biasing pad exhibiting a different durometer to thereby change the load bearing response of the vehicle occupant sensing system quickly and easily.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
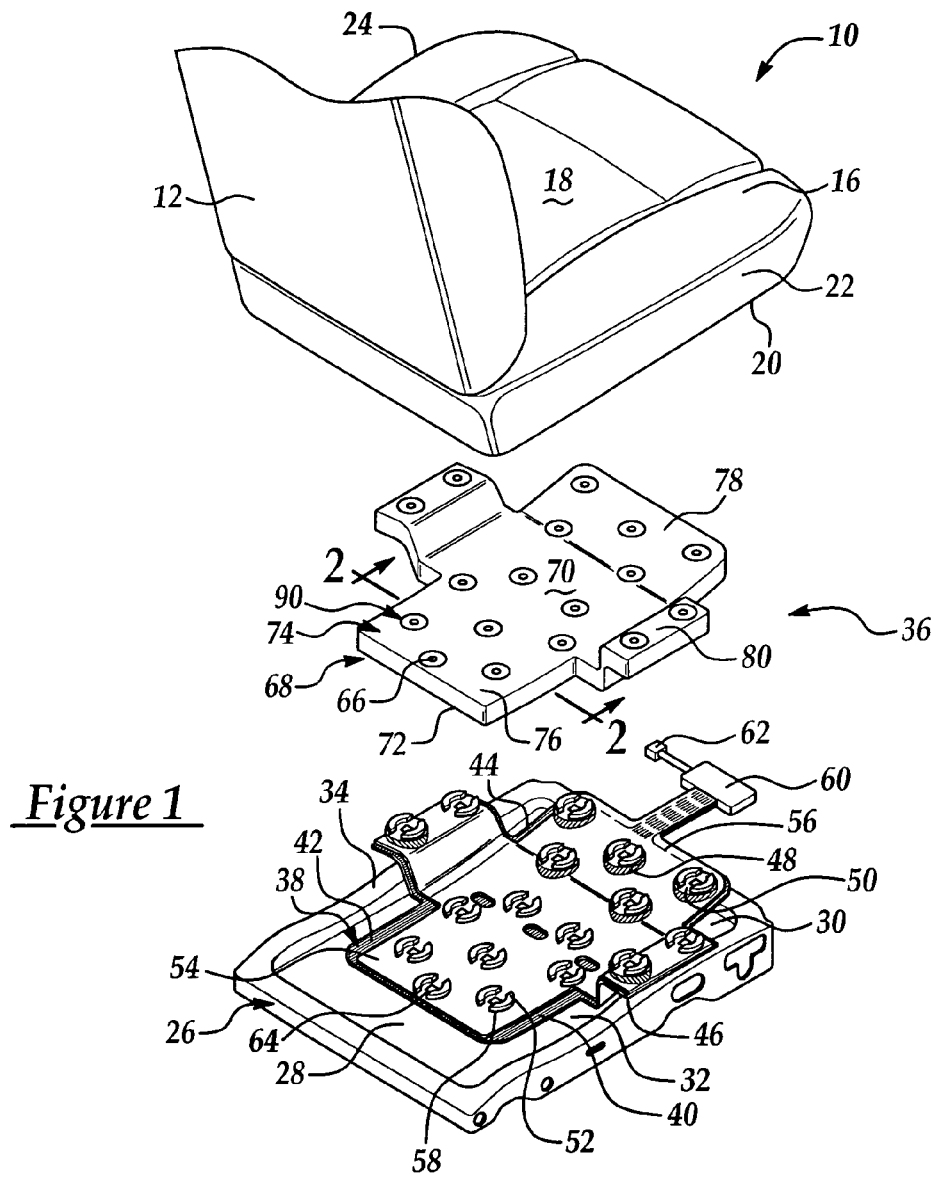
FIG. 1 is an exploded perspective view of a vehicle seat assembly having a vehicle occupant sensing system with a biasing pad.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back 12 and a seat cushion 16. The seat cushion 16 has an upper surface 18 and a lower surface 20, and also has an inboard 22 and an outboard side 24.

The vehicle seat assembly 10 also includes a seat pan, generally indicated at 26. The seat pan 26 has a substantially flat main body 28 that defines a forward portion 30 and a rear portion 32. The rear portion 32 of the seat pan 26 is substantially horizontal and parallel to the upper surface 18 of the seat cushion 16, and the forward portion 30 of the seat pan 26 is disposed at a positive angle relative to the rear portion 32. The seat pan 26 also includes a plurality of bolsters 34 disposed beneath the inboard and outboard sides 22, 24 of the seat cushion 16.

The seat assembly 10 further includes a vehicle occupant sensing system, generally indicated at 36, for detecting a condition of the vehicle seat assembly 10. For instance, the vehicle occupant sensing system 36 can detect whether or not the seat assembly 10 is occupied, whether or not the occupant is sitting in a certain position, whether or not the occupant weighs a certain amount, and/or other conditions in a manner to be described in greater detail below.

The vehicle occupant sensing system 36 includes a tray, generally indicated at 38. The tray 38 may be of the type described in detail in applicant's co-pending patent application Ser. No. 10/749,169, entitled "Vehicle Occupant Sensing System Having Circuit Carrier Tray," which is incorporated herein in its entirety by reference. The shape of the tray 38 corresponds with the shape of the seat pan 26 in the embodiment shown. As such, the tray 38 includes a main body portion 40 with a rear portion 42 and a forward portion 44 that is disposed at a positive angle relative to the rear portion 42 of the tray 38. The tray 38 also includes a plurality of bolsters 46 at each side of the tray 38 extending upward therefrom. Furthermore, the tray 38 includes a plurality of pedestals 48 extending upward from the forward portion 44 and bolsters 46 of the tray 38. The pedestals 48 are attached such that a top surface 50 of each pedestal 48 is generally parallel to the lower surface 20 of the seat cushion 16. The tray 38 is supported by the seat pan 26 such that the rear portion 42 lies atop the rear portion 32 of the seat pan 26, the forward portion 44 lies atop the forward portion 30 of the seat pan 26, and the bolsters 46 lie atop the bolsters 34 of the seat pan 26.

Additionally, the tray 38 includes at least one, and preferably, a plurality of tabs 52. In the embodiment shown, the tray 38 includes a plurality of tabs 52 each extending upwardly from the tray 38 toward the seat cushion 16. Each tab 52 is curved, and the tabs 52 are arranged in mirror image pairs to form a plurality of partial ring shapes.

The vehicle occupant sensing system 36 also includes a circuit carrier 54. The circuit carrier 54 supports an electric circuit 56. In the embodiment shown, the circuit carrier 54 is made of a thin nonconductive and corrosion-resistant material, and it encapsulates known electrical components that form the electric circuit 56. For instance, in one embodiment, a flexible printed circuit forms the circuit carrier 54 and electric circuit 56. Also, the circuit carrier 54 includes a plurality of apertures 58 having a shape and location corresponding to that of the tabs 52 of the tray 38. As such, the tabs 52 extend through the apertures 58 of the circuit carrier 54.

The electric circuit 56 is electrically connected to a controller schematically illustrated at 60. The electric circuit 56 carries electric signals generated by the vehicle occupant sensing system 36 to the controller 60 as described in greater detail below. The controller 60 is electrically attached to a restraint system, schematically illustrated at 62. The restraint system 62 can be of many types, such as an inflatable system, and the controller 60 sends output to the restraint system 62 based on the signals delivered by the electric circuit 56. Although an inflatable restraint system is discussed here, those having ordinary skill in the art will recognize that the type of restraint system 62 connected to the controller 60 does not limit the scope of the present invention.

The vehicle occupant sensing system 36 also includes at least one, and preferably, a plurality of sensors 64. The sensors 64 are mounted on the circuit carrier 54 between each pairing of tabs 52. The sensors 64 are also in electrical communication with the electric circuit 56 such that electrical signals can be transmitted between the sensors 64 and the controller 60. The sensors 64 and their method of attachment may be of the type described in detail in applicant's co-pending patent application Ser. No. 10/748,514, entitled "Vehicle Occupant Sensing System and Method of Electrically Attaching a Sensor to an Electrical Circuit," which is incorporated herein in its entirety by reference. As will be described in greater detail below, the sensors 64 are operable to detect the condition of the vehicle seat assembly 10.

The vehicle occupant sensing system 36 also includes at least one, and preferably, a plurality of emitters 66. The emitters 66 are disposed in relation to corresponding ones of the sensors 64. The sensors 64 are operable to detect relative distance between itself and the corresponding emitter 66. For instance, the emitters 66 are each magnets in one embodiment, and the sensors 64 are Hall effect sensors able to detect relative distance to the magnetized emitters 66. As will be described in greater detail below, the sensors 64 transmit a signal to the controller 60 based upon the distance detected to thereby detect the condition of the vehicle seat assembly 10.

Figure 2:
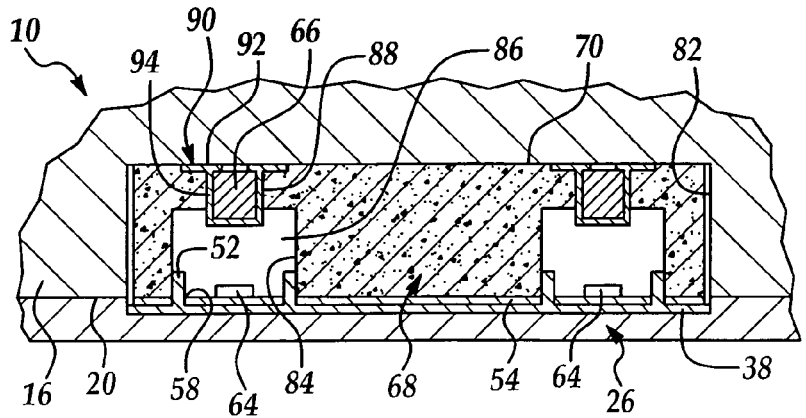
FIG. 2 is a sectional view of the vehicle seat assembly taken along the line 2—2 from FIG. 1.

The vehicle occupant sensing system 36 further includes a biasing pad, generally indicated at 68 in FIGS. 1 and 2. The biasing pad 68 is generally flat and includes a top surface 70 and a bottom surface 72. The shape of the biasing pad 68 generally corresponds with the shape of the tray 38 so as to be supported thereupon. As such, the biasing pad 68 includes a main body portion, generally indicated at 74, with a rear portion 76 and a forward portion 78 that is disposed at a positive angle relative to the rear portion 76 of the biasing pad 68. The biasing pad 68 also includes a plurality of bolsters 80 disposed at opposite sides of the biasing pad 68 and extending upward therefrom. The biasing pad 68 is supported by the tray 38 such that the rear portion 76 of the biasing pad 68 lies atop the rear portion 42 of the tray 38, the forward portion 78 lies atop the forward portion 44 of the tray 38, and the bolsters 80 lie atop the bolsters 46 of the tray 38.

Also, the biasing pad 68 is disposed below the lower surface of the 20 of the seat cushion 16 such that the top surface 70 of the biasing pad 68 contacts the lower surface 20 of the seat cushion 16. In one embodiment shown in FIG. 2, the lower surface 20 of the seat cushion 16 defines a recess 82 extending upward. The shape of the recess 82 corresponds with the shape of the biasing pad 68 such that the biasing pad 68 can fit within the recess 82 flush with respect to the surrounding areas of the lower surface 20 of the seat cushion 16.

The biasing pad 68 supports at least one of the emitters 66 and the sensors 64. In the embodiment shown for instance, the biasing pad 68 supports each of the emitters 66 near the top surface 70 such that each emitter 66 is disposed above a corresponding sensor 64. Also, the biasing pad 68 is preferably made of a resilient material, such as a viscoelastic material, so that the emitters 66 are supported for movement toward and away from the corresponding sensors 64 and so that the biasing pad 68 biases the emitters 66 away from the corresponding sensors 64. As will be described in greater detail below, the biasing pad 68 allows the vehicle occupant sensing system 36 to detect a condition of the vehicle seat assembly 10, such as whether or not it is occupied, whether or not the occupant is sitting in a certain position, whether or not the occupant weighs a certain amount, and/or other conditions of the vehicle seat assembly 10.

In the embodiment shown, the biasing pad 68 has at least one, and preferably, a plurality of cavities 84 formed therein. As best illustrated in FIG. 2, each cavity 84 extends through the thickness of the biasing pad 68 from the bottom surface 72 to the top surface 70 of the biasing pad 68. Each cavity 84 includes a lower portion 86 of a constant diameter in communication with an upper portion 88 of a smaller constant diameter.

The vehicle occupant sensing system 36 also includes at least one, and preferably, a plurality of emitter holders, generally indicated at 90. As best illustrated in FIG. 2, each emitter holder 90 includes a disc 92 and a cup 94 mounted to the disc 92 and extending downward therefrom. The cup 94 is positioned within the upper portion 88 of the respective cavity 84 such that the disc 92 abuts against the top surface 70 of the biasing pad 68. The disc 92 of each emitter holder 90 is mounted to the biasing pad 68 with adhesive or in any other suitable manner. The emitter 66 is supported within the cup 94 such that the emitter 66 is at least partially disposed within the cavity 84.

Moreover, the lower portion 86 is sized so as to receive one of the pairs of tabs 52 therein. In the preferred embodiment, the tabs 52 abut against the inner surface of the lower portion 86 of the respective cavity 84 and are mounted thereto. The tabs 52 can be mounted to the biasing pad 68 with adhesive or in any other suitable manner. As stated above, a sensor 64 is mounted to the circuit carrier 54 between each pair of tabs 52. Thus, with the tabs 52 mounted to the biasing pad 68, the circuit carrier 54 is mounted relative to the biasing pad 68 such that the sensors 64 are disposed within corresponding cavities 84. As a result, each sensor 64 is positioned below a corresponding emitter 66, and the biasing pad 68 supports the emitter 66 for movement toward and away from the corresponding sensor 64 within the cavity 84.

Therefore, when the vehicle seat assembly 10 is unoccupied, the biasing pad 68 suspends the emitters 66 away from the corresponding sensors 64 at a known distance, and the sensors 64 transmit correlative signals to the controller 60. Also, when the vehicle seat assembly 10 is occupied, the weight of the occupant deflects the seat cushion 16, and the biasing pad 68 deflects in response to deflection of the seat cushion 16, thereby causing the emitters 66 to move within the corresponding cavity 84 toward the corresponding sensors 64. As a result, the sensors 64 detect the change in distance to the corresponding emitters 66 and transmit correlative signals to the controller 60. The controller 60 sends output to the restraint system 62 based on these correlative signals, and the restraint system 62 is operated accordingly.

The biasing pad 68 can be relatively thin, measuring approximately 20 millimeters in thickness in one embodiment. Preferably, the durometer (i.e., the resistance of the material to indentation) of the biasing pad 68 is substantial enough to inhibit the emitter 66 from contacting and potentially damaging the respective sensor 64 but instead suspends the emitters 66 above the corresponding sensor 64 under most loads. Additionally, the emitters 66 preferably move substantially aligned with the corresponding sensor 64.

Advantageously, the vehicle occupant sensing system 36 includes relatively few parts. For instance, the biasing pad 68 can be used to bias each of the emitters 66 away from the sensors 64 instead of including separate biasing members for each pair. As such, assembly time and cost of the vehicle occupant sensing system 36 is reduced. Also, by altering the material of the biasing pad 68, the load bearing response of the vehicle occupant sensing system 36 can be easily changed. For instance, the biasing pad 68 may be exchanged with a biasing pad 68 exhibiting a different durometer to thereby change the load bearing response of the vehicle occupant sensing system 36 quickly and easily.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle occupant sensing system for a vehicle seat assembly, said vehicle occupant sensing system comprising:
a plurality of emitters;
a plurality of sensors, wherein each of said sensors is operatively paired to one of said emitters and adapted to detect relative distance therebetween, and thereby detect a condition of the vehicle seat assembly; and
a biasing pad having a top surface and a bottom surface, said top surface adapted to be disposed below a lower surface of a seat cushion of the vehicle seat assembly so that said top surface of said biasing pad is adapted to be biased into contact with the lower surface of the seat cushion of the vehicle seat assembly, being deflectable in response to deflection of the seat cushion, said biasing pad supporting said plurality of emitters and said plurality of sensors such that said operatively paired emitters and sensors are biased away from each other and such that said operatively paired emitters and sensors are supported so that they are movable toward and away from the other.

2. A vehicle occupant sensing system as set forth in claim 1, wherein said biasing pad includes at least one cavity formed therein, and one of said operatively paired emitters and sensors is supported for movement toward and away from the other within said cavity.

3. A vehicle occupant sensing system as set forth in claim 1, further comprising a plurality of emitter holders mounted to said biasing pad, said plurality of emitters supported by said plurality of emitter holders.

4. A vehicle occupant sensing system as set forth in claim 3, wherein each of said emitter holders include a disc and a cup mounted to said disc, said emitters supported within said cup.

5. A vehicle occupant sensing system as set forth in claim 1, wherein said biasing pad is made out of a viscoelastic material.

6. A vehicle occupant sensing system as set forth in claim 1, further comprising a circuit carrier supporting an electric circuit, said sensors in electrical communication with said electric circuit, and said circuit carrier positioned against said biasing pad.

7. A vehicle occupant sensing system as set forth in claim 6, further comprising a tray with at least one tab, said tray supporting said circuit carrier, and said tab extending through said circuit carrier and mounted to said biasing pad.

8. A vehicle seat assembly comprising:
a seat cushion having an upper surface and a lower surface; and
a vehicle occupant sensing system that includes a plurality of emitters, a plurality of sensors, wherein each of said sensors is operatively paired to one of said emitters detecting a relative distance therebetween, thereby detecting a condition of the vehicle seal assembly, and a biasing pad having a top surface and a bottom surface, said top surface disposed below the lower surface of said seat cushion of the vehicle seat assembly so that said top surface of said biasing pad is biased into contact with said lower surface of said seat cushion, deflecting in response to deflection of said seat cushion, said biasing pad supporting said plurality of emitters and said plurality of sensors such that said operatively paired emitters and sensors mare biased away from each other and such that said operatively paired emitters and sensors are supported so that they are moveable toward and away from the other.

9. A vehicle seat assembly as set forth in claim 8, wherein said biasing pad includes at least one cavity formed therein, and one of said operatively paired emitters and sensors is supported for movement toward and away from the other within said cavity.

10. A vehicle seat assembly as set forth in claim 8, further comprising a plurality of emitter holders mounted to said biasing pad, said plurality of emitters supported by said plurality of emitter holders.

11. A vehicle seat assembly as set forth in claim 10, wherein each of said emitter holders include a disc and a cup mounted to said disc, said emitters supported within said cup.

12. A vehicle seat assembly as set forth in claim 8, wherein said biasing pad is made out of a viscoelastic material.

13. A vehicle seat assembly as set forth in claim 8, further comprising a circuit carrier supporting an electric circuit, said sensors in electrical communication with said electric circuit, and said circuit carrier positioned against said biasing pad.

14. A vehicle seat assembly as set forth in claim 13, further comprising a tray with at least one tab, said tray supporting said circuit carrier, and said tab extending through said circuit carrier and mounted to said biasing pad.

15. A vehicle occupant sensing system for detecting a condition of a vehicle seat assembly, said vehicle occupant sensing system comprising;
a plurality of emitters;
a plurality of sensors, wherein each of said sensors is operatively paired to one of said emitters and adapted to detect relative distance therebetween, and thereby detect a condition of the vehicle seat assembly; and
a biasing pad having a plurality of cavities formed therein and a top surface, said top surface adapted to be disposed below a lower surface of a seat cushion of the vehicle seat assembly so that said top surface of said biasing pad is adapted to be biased into contact with a lower surface of the seat cushion, said biasing pad supporting said plurality of emitters and said plurality of sensors such that said operatively paired emitters and sensors are supported so that they are movable toward and away from the other within said cavities, said biasing pad biasing said emitters away from said sensors.

16. A vehicle occupant sensing system as set forth in claim 15, further comprising a plurality of emitter holders mounted to said biasing pad, said plurality of emitters supported by said plurality of emitter holders.

17. A vehicle occupant sensing system as set forth in claim 16, wherein each of said emitter holders include a disc and a cup mounted to said disc, said emitters supported within said cup such that said emitters are at least partially disposed in said cavity.

18. A vehicle occupant sensing system as set forth in claim 15, wherein said biasing pad is made out of a viscoelastic material.

19. A vehicle occupant sensing system as set forth in claim 15, further comprising a circuit carrier supporting an electric circuit, said sensors in electrical communication with said electric circuit, and said circuit carrier disposed relative to said biasing pad such that said sensors are disposed within said cavities.

20. A vehicle occupant sensing system as set forth in claim 19, further comprising a tray with at least one tab, said tray supporting said circuit carrier, and said tab extending through said circuit carrier and mounted to said biasing pad.

* * * * *

UNITED STATES PATENT AND TRADEMARK OFFICE
CERTIFICATE OF CORRECTION

PATENT NO. : 7,100,980 B2  Page 1 of 1
APPLICATION NO. : 10/974155
DATED : September 5, 2006
INVENTOR(S) : Young et al.

It is certified that error appears in the above-identified patent and that said Letters Patent is hereby corrected as shown below:

Column 7, line 53 delete "seal" and insert therefor --seat--.

Column 7, line 62 delete "mare" and insert therefor --are--.

Signed and Sealed this

Twenty-third Day of December, 2008

JON W. DUDAS
*Director of the United States Patent and Trademark Office*